COMPARATOR CIRCUIT FOR BINARY AND TERNARY SIGNALS

Filed June 24, 1964 2 Sheets-Sheet 1

INVENTORS
JOHN M. BAILEY, JR. &
BY ROBERT G. MOY
John V. Regan
Attorney

COMPARATOR CIRCUIT FOR BINARY AND TERNARY SIGNALS
Filed June 24, 1964 2 Sheets-Sheet 2
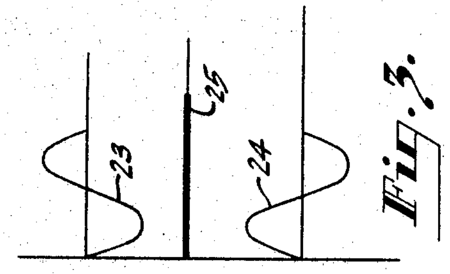
Fig. 3.
TABLE 1
| FLIP-FLOP | CODE | SENSE SIG. | COMPARISON | OUTPUT SIG. |
|---|---|---|---|---|
| 1 | 1 | S | MATCH | NO |
| 1 | 0 | ~ | MISMATCH | YES |
| 1 | X | — | MATCH | NO |
| 0 | 1 | S | MISMATCH | YES |
| 0 | 0 | ~ | MATCH | NO |
| 0 | X | — | MATCH | NO |
Fig. 4.
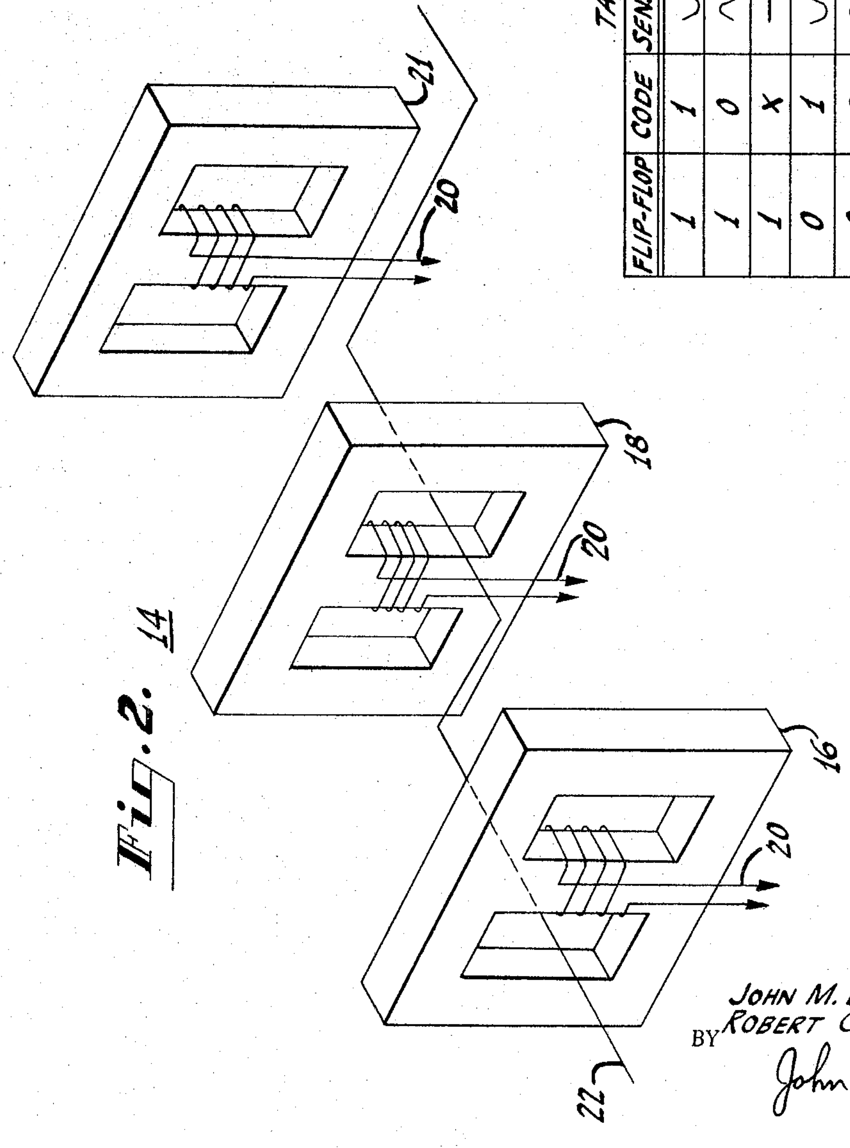
Fig. 2.
INVENTORS
JOHN M. BAILEY, JR. &
ROBERT G. MOY
BY John V. Regan
Attorney 3,297,987
Patented Jan. 10, 1967

3,297,987

COMPARATOR CIRCUIT FOR BINARY AND TERNARY SIGNALS

John M. Bailey, Jr., Fairport, N.Y., and Robert G. Moy, Haddonfield, N.J., assignors to Radio Corporation of America, a corporation of Delaware Filed June 24, 1964, Ser. No. 377,658
11 Claims. (Cl. 340—146.2)

This invention relates to comparator circuits, and more particularly to comparator circuits which may find use, for example, with memories capable of storing data in ternary form.

In certain data processing equipment, memories capable of storing data signals in ternary or three-valued form are desirable or necessary. One such equipment may, for example, be an optical character reader which reads and recognizes alpha-numeric characters printed on documents. Certain of such character readers read by scanning successively the characters on the document with a plurality of scans to produce video signals which serially represent the features of the characters. The features of a character may, for example, comprise the divisions into which the outline trace of a character may be divided, such as left vertical strokes, right vertical strokes, etc. The presence and absence of such features in a character are detected in the character reader and then may be stored in binary form. A binary "1" information signal may indicate that a particular feature is present in the character whereas a binary "0" may indicate that a particular feature is absent. At the end of scanning the entire character, all of the detected binary information feature signals are compared against a memory of stored descriptive feature signals which describe the characters. When a match between the two sets of signals is obtained, the character is recognized.

For particular individual features which are easy to detect, there exist characters which always have the feature, characters which never have the feature, and characters which may or may not have the feature. For example, a left vertical stroke is an easily detectable feature. This feature is always present in an F, always absent in a 3, but may or may not be present and detected in a C; depending on the font, the inked impression, etc. Such an ambiguity presents a problem when identification of the detected information feature signals is to be made. If a character exhibits a plurality of such ambiguous features, storing the descriptive feature signals in binary form requires an excessive amount of equipment. For example, a character with $n$ ambiguous features requires $2^n$ combinations in binary form to fully describe this character. A ternary form of storage reduces the amount of equipment used to store descriptions containing ambiguous features. In ternary form, one stored descriptive signal, labelled a "1," indicates an absolutely present feature, a second stored descriptive signal, labelled a "0," indicates an absolutely absent feature, and a third stored descriptive signal, labelled an "$x$," indicates that a feature may or may not be present. Such a ternary form of storage requires only one combination to fully describe the features of a character which exhibits a plurality of ambiguous features. A core type magnetic memory may, for example, provide a ternary form of storage, as will be more fully described later in the specification. A comparator is then required to compare the detected binary signals with the stored ternary signals to determine if a match occurs.

Accordingly, it is an object of this inveniton to provide a new and improved comparator circuit.

It is another object of this invention to provide a new and improved comparator circuit for use with memories capable of storing ternary signals.

It is still another object of this invention to provide a comparator circuit for comparing binary signals with ternary signals.

A comparator circuit in accordance with the invention compares information signals detected in binary form with descriptive signals stored in ternary form to determine if the two sets of signals match. Ternary descriptive signals of "1" and "0" values may, for example, represent or correspond to information signals of binary "1" and binary "0" values, respectively, whereas a ternary signal of a third value "$x$" corresponds to an information signal of either a binary "1" value or a binary "0" value. The ternary signals are stored in a memory which includes a sensor for reading out the stored signals. The sensor produces, when the memory is activated, a first sense signal of one phase for a stored ternary "1" descriptive signal, a second sense signal of an opposite phase for a stored ternary "0" descriptive signal, and a third sense signal of substantially zero amplitude for a stored ternary "$x$" descriptive signal.

The comparator includes a polarity or phase detector, such as a transistor for detecting the sense signals. The transistor is normally reverse biased to be rendered nonconductive. Sense signals from the sensor are coupled to be detected by the transistor detector by connecting the first and second terminals of the sensor to the input electrode of the transistor. First and second switch means are coupled respectively to the first and second terminals of the sensor to connect either terminal to ground under the control of and depending on the binary value of a detected information feature signal. When the first terminal of the sensor is grounded by the first switch means, only a sense signal of one polarity forward biases the transistor detector to conduction. Alternatively, when the second terminal of the sensor is grounded, only the other sense signal of the opposite polarity forward biases the transistor detector to conduction. In neither instance will a third sense signal forward bias the transistor to conduction. Thus, a matching of the two signal sets is provided by a plurality of comparators in accordance with the invention.

In the drawing:

FIGURE 2 is an isometric view of one type of magnetic memory capable of storing signals in ternary form;

FIGURE 3 is an illustration of the ternary signals derived from the magnetic memory of FIGURE 2; and, FIGURE 4 is a table summarizing the operation of the circuit of FIGURE 1.

Figure 1:
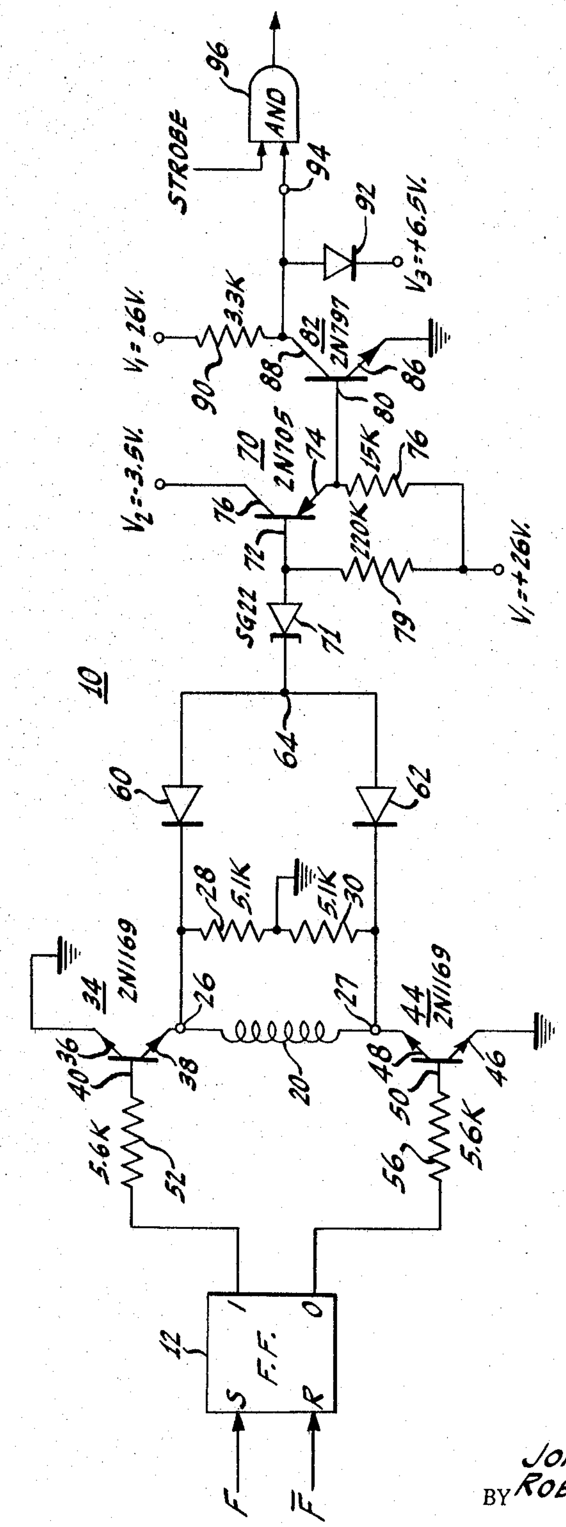
FIGURE 1 is a schematic circuit diagram of a comparator in accordance with the invention.

Referring now to FIGURE 1, a comparator 10 compares detected information signals stored in binary form in a flip-flop 12 with descriptive data signals stored in ternary form in a magnetic memory. One memory capable of storing signals in ternary form is the magnetic memory 14 shown in FIGURE 2. Such a memory 14 has been described in a copending application entitled "Read Only Memory" by Chia Ying Hsueh and Henry P. Cichon, Serial No. 232,388, filed October 23, 1962, now Patent No. 3,238,648 dated March 8, 1966 and assigned to the same assignee as the present application.

The memory 14 in FIGURE 2 includes a plurality of two-aperture E-cores, 16, 18 . . . $n$, made of magnetic material. A separate E-core is included in the memory 14 to store a signal representing each different feature that can be detected in alpha-numeric characters. Thus, there are $n$ E-cores in a memory 14, one for each of $n$ features that may occur in a character. Each E-core includes a sensor or secondary winding 20 wound around the center leg of the core and a primary or drive winding 22 theaded through either one or neither of the apertures of each core. A description of a character is thereby provided by the locations of the drive winding 22 with respect to the apertures. A separate drive winding 22 is included in the memory 14 for each different character. Thus, the memory 14 is character or word-organized and is of the read only type.

When a drive winding 22 is threaded through one aperture of an E-core, such as the core 16, a descriptive data signal of the ternary value of "1" is stored in the core. Such a data signal denotes that the particular feature represented by the core is always present in a character description. A drive current applied to the drive winding 22 causes a negative voltage or a first sense signal of one phase to be induced in the sense winding 20 of this core. Such a first sense signal is illustrated by the initial negative half cycle of the curve 23 in FIGURE 3. A second or positive half cycle of the curve 23 is also produced but this is an undesired or noise pulse which must be eliminated in the comparator 10 for correct operation, as will be described more fully later.

When the drive winding 22 is threaded through the other aperture of an E-core, such as the core 18, a descriptive data signal of the ternary value of "0" is stored in the core. Such a data signal denotes that the particular feature represented by the core 18 is always absent from the character description. A drive current applied to the winding 22 produces in the sense winding 20 of this core a positive voltage or a second sense signal opposite in phase to the first sense signal. Such a second sense signal is shown by the initial positive half cycle of the curve 24 in FIGURE 3. The negative portion of this signal is a noise pulse.

When the drive winding 22 is threaded through neither of the apertures of an E-core, such as the core *n*, a descriptive data signal of the ternary value of "*x*" is stored in the core. Such a data signal indicates that the particular feature represented by this core is ambiguous and may or may not be present and detected in the character. A drive current applied to the drive winding 22 produces in the sense winding 20 of the core *n* a third sense signal of zero amplitude. Such a sense signal is shown by the line 25 in FIGURE 3. The third sense signal 25 may also be produced by threading a separate drive winding through each of the apertures in an E-core. When both windings are simultaneously pulsed in such an arrangement, first and second sense signals are produced. However, since the first and second sense signals are of opposite phase, they cancel and their sum is substantially zero. Thus, the third sense signal 25 may be considered the sum of the first and second sense signals of opposite phase. A notation "*x*" is selected to denote this signal which differs from the normal ternary notation.

Referring back to FIGURE 1, the comparator 10 compares the binary signal stored in one flip-flop 12 with a ternary signal stored in one E-core. A separate comparator 10 is used for each feature signal. The sense winding or sensor 20 in FIGURE 1 includes first and second terminals 26 and 27 across which are shunted a pair of serially connected terminating resistors 28 and 30. The junction of the resistors 28 and 30 are connected to a common point or ground in the comparator 10. The first terminal 26 of the sensor 20 is coupled to a bilaterally conducting transistor 34 of the NPN type conductivity. The transistor 34 includes first and second electrodes 36, 38 which define a conductive path through the transistor 34, through which current may flow in either direction. The first electrode 36 is grounded while the second electrode 38 is connected to the terminal 26 of the sense winding 20. A base electrode 40 of the transistor 34 controls the conductance and hence the current through the conductive path of this transistor.

The second terminal 27 of the sensor 20 is also coupled to a bilaterally conducting transistor 44 of the NPN type conductivity. The transistor 44 includes first and second electrodes 46, 48 which define a conductive path in this transistor through which current may flow in either direction. The first electrode 46 is grounded while the second electrode 48 is connected to the terminal 27. A base electrode 50 controls the current in the conductive path of the transistor 44. The base 40 of the first transistor 34 is coupled through a base resistor 52 to the "1" output terminal of the flip-flop 12. Similarly, base 50 of the second transistor 44 is coupled through a base resistor 56 to the "0" output terminal of the flip-flop 12. As will be described subsequently, transistors 34 and 44 function as switches which operate under the control of the binary signal stored in the flip-flop 12 to ground one or the other of the terminals 26 and 27.

A pair of impedances such as the unidirectional conducting diodes 60 and 62 are connected from the terminals 26 and 27, respectively, of the sensor 20 to a junction point 64. The cathodes of the diodes 60 and 62 are directly connected to the terminals 26 and 27, respectively, while the anodes of the diodes are connected to the junction point 64. A pair of resistors may be substituted for the diodes 60 and 62 but resistors will function as a voltage divider for the sense signals. Thus, the diodes 60 and 62 are the preferred impedances.

A base or input electrode 72 of a transistor detector 70 is coupled to the junction 64 through a Stabistor or level shifting diode 71. The transistor 70 which is a PNP type also includes a first or emitter electrode 74 which is coupled through a resistor 76 to the positive potential terminal of a power supply $V_1$. The collector or second electrode 76 of the transistor 70 is connected directly to the negative potential terminal of a second power supply $V_2$. The first power supply $V_1$ is also coupled through a resistor 79 to the junction of the base 72 of the transistor 70 and the anode of the Stabistor diode 71.

The emitter 74 of the detector transistor 70 is connected directly to the base 80 of an output transistor 82, of the NPN type conductivity. The emitter 86 of the transistor 82 is grounded while the collector 88 thereof is coupled through a load resistor 90 to the power supply $V_1$. The collector 88 is also coupled to the anode of a clamp diode 92, the cathode of which is connected to the positive potential terminal of the third power supply $V_3$. The collector 88 also defines an output terminal 94 for the comparator 10. The output terminal 94 is coupled to one input terminal of an AND gate 96. A strobe signal, synchronized with the read pulse applied to the drive winding 22 in the magnetic memory 14, is applied to the other terminal of the AND gate 96 to remove noise signal pulses from the comparator 10. Typical types and values of the components used in a comparator 10 are shown in FIGURE 1.

In quiescent operation, the flip-flop 12 is either in the set or reset state depending on whether or not a signal F, denoting the presence of a feature, or a signal $\overline{F}$, denoting the absence of a feature, has been detected and applied, respectively, to the set or reset terminals thereof. It is assumed that the flip-flop 12 is reset by a $\overline{F}$ signal and therefore stores a binary "0" signal denoting the absence of a feature. When reset, the flip-flop 12 produces a positive level output from the "0" terminal thereof and a negative level output from the "1" terminal thereof. Consequently, the transistor 44 will be biased to conduction and transistor current is derived from the power supply $V_1$. The values of the circuit components are selected such that the transistor 44 is saturated when biased to conduction by the flip-flop 12. If, on the other hand, the transistor 34 is biased to conduction by the flip-flop 12, then the transistor 34 will be saturated.

When the transistor 44 is saturated, the terminal 27 of the sensor 20 is substantially at ground potential level. At the same time, the transistor 34 is nonconductive and therefore the terminal 26 of the winding 20 is floating. Therefore, the transistors 34 and 44 effectively function as a single-pole, double-throw switch under the control of the flip-flop 12 for grounding one or the other of the terminals of the sensor 20 depending on the value of the binary signal stored in the flip-flop 12.

Quiescently, the detector transistor 70 is biased to cutoff due to the conduction of the output transistor 82. The transistor 82 is saturated and the base 80 thereof is substantially at ground potential. Consequently, the emitter 74 of the transistor 70 is clamped to substantially the same potential. However, the base 72 of the transistor 70 is above ground by an amount substantially equal to the forward biased voltage drops across the Stabistor diode 71 and one of the diodes 60 or 62. Thus, the base-emitter junction of the transistor 70 is reverse biased and the base 72 requires a negative input signal to become forward biased. The base-emitter junction of the transistor 70 therefore functions as a unilateral conducting device to detect the polarity or phase of the sense signals.

The saturation of the output transistor 82 causes the collector 88 thereof to be substantially at ground potential. Consequently, the output terminal 94 is also at ground potential during quiescent operation.

In dynamic operation, a drive or read pulse is applied to a drive winding 22 of the magnetic memory 14. It is first assumed that the sensor 20 of FIGURE 1 is wound on an E-core which is storing a ternary "1" signal. Consequently, the sensor 20 produces a first sense signal, such as that shown by the signal 23 in FIGURE 3. The terminal 26 of the winding 20 goes more negative than ground due to this negative signal because the terminal 27 is clamped to ground by the saturated transistor 44. The transistor 44 is saturated because it is assumed the flip-flop 12 is storing a binary "0" signal. The base 72 of the transistor 70 effectively follows the potential of the ungrounded terminal of the sensor 20 so the negative pulse causes the base 72 of the transistor 70 to go negative or below ground. Simultaneously, the diode 62 reverse biases. The base 72–emittter 74 junction forward biases and the transistor 70 conducts. The conduction of the detector transistor 70, which is connected as an emitter follower, produces a negative-going pulse at the emitter thereof. The transistor 82 is therefore cut off and the output terminal 94 rises from ground toward the $V_1$ (26 volt) potential level. When the potential at the output terminal 94 reaches the $V_3$ potential level (6.5 volts), the diode 92 clamps the terminal 94 at this level. Thus, a positive pulse is applied to the AND gate 96 and a coincident strobe signal activates the gate 96 to produce an output signal from the comparator 10. The output signal is effectively a mis-match signal since a binary "0" was compared to a ternary "1" signal. The positive half cycle or noise pulse of the first sense signal 23 is blocked by the transistor 70 since the positive noise pulse reverse biases the base-emitter junction of this transistor.

If the E-core is storing a ternary "0" signal and the flip-flop 12 is reset, a second sense signal, such as the signal 24 in FIGURE 3, is produced at the terminal 26 of of the sensor 20 when the memory is sensed. The second sense signal 24 is of an opposite phase to the first sense signal 23 and this positive pulse is blocked by the detector transistor 70. Thus, no output signal is available when a strobe signal is applied to the AND gate 96. Therefore, a match between a binary signal and a ternary signal produces no output from the comparator 10 of FIGURE 1. The negative half cycle or noise portion of the second sense signal 24 is passed by the transistor 70 but is blocked by absence of a coincident strobe signal at the AND gate 96. Thus, undesired noise pulses do not produce an output signal from the comparator 10.

When the flip-flop 12 is set thereby storing a binary "1" signal, a positive level signal is produced at the "1" output terminal thereof and a negative level signal is produced at the "0" output terminal thereof. Therefore, the transistor 34 is biased to conduction and is saturated while the transistor 44 is cut off. The terminal 26 of the sensor 20 is therefore grounded and the terminal 27 thereof is floating or ungrounded. If the E-core, on which the sensor 20 is wound, is storing a ternary "1" signal, a first sense signal 23 (FIGURE 3) is produced in the sensor 20 when the memory is sensed. However, since the terminal 26 is clamped to ground, a complementary signal of opposite phase to the first sense signal is produced at the terminal 27. The complementary signal appears like the signal 24 of FIGURE 3. The complementary signal is blocked by the transistor 70 because it is a positive signal. The negative noise portion thereof is blocked by the strobe signal in the AND gate 96. Thus, the comparison of a binary "1" and a ternary "1" signal produces no output from the comparator 10.

When the flip-flop 12 is set and the E-core is instead storing a ternary "0" signal, a second sense signal 24 is produced in the sensor 20 when the memory 14 is sensed. Since the terminal 26 of the sensor 20 is grounded, the complement of this signal, which is similar to the signal 23 of FIGURE 3, appears at the terminal 27. The initial negative portion of the complementary signal is passed by the transistor 70 to produce an output pulse from the comparator 10. The noise portion of the complementary signal is blocked by the transistor 70.

When the E-core is storing a ternary "*x*" signal, no output voltage is produced in the sensor 20 since the third sense signal 25 (FIGURE 3) is substantially of zero amplitude. Thus, regardless of the state of the flip-flop 12, no output signal is derived from the comparator 10 when a ternary "*x*" is stored in the E-core of the memory 14. It is to be noted that ambiguous or ternary "*x*" signals are not relied upon for recognizing a character so it is not necessary to produce an output from the comparator 10 when such a ternary signal is stored.

The operation of the comparator 10 is summarized in tabular form in FIGURE 4. An output signal is produced only when there is a complete mismatch between the binary and ternary signals. By reversing the connections of the flip-flop to the transistors 34 and 44, output signals will be produced only when the ternary and binary signals match.

It is to be noted that the bilateral characteristic of the transistors 34 and 44 permit current to flow in either direction between their first and second electrodes. Each of these transistors remains saturated, when biased to conduction. Thus, the associated sense winding terminal is clamped to ground, regardless of the changing polarity of the sense signal induced in the winding 20.

It is also to be noted that while there has to be *n* detector transistors 70 for a character description of *n* features, there need only be one output transistor 82. The emitter electrodes of each of the *n* detector transistors 70 in a character reader are coupled directly to the base electrode 80 of the single output transistor 82. One or more mis-matches between binary and ternary signals cuts off the transistor 82 to produce an output pulse.

It is further to be noted that the comparator 10 is capable of comparing binary signals with other binary signals. In such operation, the memory utilized need not be of the type shown in FIGURE 2.

Thus, in accordance with the invention, a comparator is provided which is particularly adapted to compare binary signals with ternary signals. The comparator may also be utilized to compare sets of binary signals.

What is claimed is:

1. A comparator for comparing two sets of binary signals from first and second signal sources, said first signal sources including a sensor having first and second terminals for producing across said terminals a first sense signal of one polarity when a binary "1" signal is sensed and a second sense signal of an opposite polarity when a binary "0" is sensed, said comparator comprising, a unidirectional conducting device having first and second terminals,
first and second means for respectively coupling said first and second terminals of said sensor to the first terminal of said device,
switch means having first and second operating positions for respectively coupling said first and second terminals of said sensor to said second terminal of said unidirectional conducting device,
means coupling said second signal source to switch said switch means to said first operating position for connecting said first terminal of said sensor to said second terminal of said device when a binary signal of one value in said second signal source is compared with said first signal source so that a sense signal of only said one polarity passes through said device, and
means for coupling said second signal source to switch said switch means to said second operating position for connecting said second terminal of said sensor to said second terminal of said device when a binary signal of the other value in said second signal source is compared with said first signal source so that a sense signal of only said opposite polarity passes through said device.

2. A comparator for comparing binary signals with ternary signals stored in a memory, ternary signals of "1" and "0" values corresponding, respectively, to binary signals of "1" and "0" values whereas a ternary signal of a third value "*x*" corresponds to either one of said binary "1" and binary "0" signals, said memory including a sensor having first and second terminals for producing across said terminals a first sense signal of one phase when a ternary "1" signal is sensed, a second sense signal of an opposite phase when a ternary "0" signal is sensed, and a third sense signal of substantially zero amplitude when a ternary "*x*" signal is sensed, said comparator comprising in combination,
a unidirectional conducting device having first and second terminals,
first and second means for respectively coupling said first and second terminals of said sensor to the first terminal of said device,
switch means having a first and second operating positions for respectively coupling said first and second terminals of said sensor to said second terminal of said unidirectional conducting device,
means for switching said switch means to said first operating position for connecting said first terminal of said sensor to said second terminal of said device when a binary signal of one value is compared with said ternary signals so that a ternary sense signal of only one phase passes through said device, and
means for switching said switch means to said second operating position for connecting said second terminal of said sensor to said second terminal of said device when a binary signal of the other value is compared with said ternary signals so that a ternary sense signal of only said opposite phase passes through said device.

3. A comparator for comparing binary signals with ternary signals stored in a memory, ternary signals of "1" and "0" values corresponding, respectively, to binary signals of "1" and "0" values whereas a ternary signal of a third value "*x*" corresponds to either one of said binary "1" and binary "0" signals, said memory including a sensor having a first and second terminals and producing across said terminals a first sense signal of one phase when a ternary "1" signal is sensed, a second sense signal of an opposite phase when a ternary "0" signal is sensed, and a third sense signal of substantially zero amplitude when a ternary "*x*" signal is sensed, said comparator comprising in combination,
a unidirectional conducting device having first and second terminals,
first and second means for respectively coupling said first and second terminals of said sensor to the first terminal of said device,
first switch means for connecting the first terminal of said sensor to the second terminal of said device when a binary signal of said one value is compared with said ternary signals so that a ternary sense signal of only said one phase is conducted through said device, and
second switch means for connecting said second terminal of said sensor to the second terminal of said device when a binary signal of the other value is compared with said ternary signals so that a ternary sense signal of only said opposite phase is conducted through said device.

4. A comparator for comparing binary signals with ternary signals stored in a memory, ternary signals of "1" and "0" values corresponding, respectively, to binary signals of "1" and "0" values whereas a ternary signal of a third value "*x*" corresponds to either one of said binary "1" and binary "0" information signals, said memory including a sensor having first and second terminals and producing across said terminals a first sense signal of one phase when a ternary "1" signal is sensed, a second sense signal of an opposite phase when a ternary "0" signal is sensed, and a third sense signal of substantially zero amplitude when a ternary "*x*" signal is sensed, said comparator comprising in combination,
a transistor having input and first and second electrodes,
means coupled between said first and second electrodes for supplying energizing signals to said transistor,
means for reverse biasing said input electrode with respect to said first electrode to render said transistor non-conductive to said energizing signals,
first and second impedance means for coupling respectively said first and second terminals of said sensor to the input electrode of said transistor,
first switch means for connecting the first terminal of said sensor to the first electrode of said transistor when a binary signal of one value is compared with said ternary signals so that a ternary signal of only said one phase forward biases said transistor to conduction, and
second switch means for connecting the second terminal of said sensor to the first electrode of said transistor when a binary signal of the other value is compared with said ternary signals so that a ternary sense signal of only said opposite phase forward biases said transistor to conduction.

5. An electrical circuit comprising in combination,
a memory for storing data in ternary form,
said memory including a sensor having first and second terminals for sensing signals of first, second and third ternary values, respectively, by producing across said terminals a first positive signal, a second negative signal, and a third signal of substantially zero amplitude,
a unidirectional conducting device having first and second terminals,
first and second impedance means for coupling respectively said first and second terminals of said sensor to the first terminal of said device,
a bistable storage circuit for storing signals in binary form,
first switch means under the control of said bistable circuit for connecting the first terminal of said sensor to the second terminal of said device when a binary signal of one value is stored in said bistable circuit so that a ternary sense signal of only said one polarity is conducted through said device, and
second switch means under the control of said bistable circuit for connecting the second terminal of said sensor to the second terminal of said device when a binary signal of the other value is stored in said bistable circuit so that a ternary sense signal of only said opposite polarity is conducted through said device, whereby binary signals in said bistable circuit are compared with ternary signals stored in said memory.

6. An electrical circuit having a reference potential point comprising in combination, a sensor having first and second terminals for providing sense signals that are positive and negative with respect to said potential point, switch means having first and second operating positions for respectively connecting said first and second terminals to said reference potential point, a unidirectional conducting device having first and second terminals, means coupling said first and second terminals of said sensor to said first terminal of said device, and means coupled from said second terminal of said device to said reference potential point to derive an output signal when said switch means is operating in said first position and said sensor provides a positive signal, and when said switch means is operating in said second position and said sensor provides a negative signal.

7. An electrical circuit in accordance with claim 6, wherein said sensor comprises a sense winding of a magnetic core storage device.

8. An electrical circuit in accordance with claim 6, wherein said sensor comprises a sense winding of a read-only magnetic core storage device and produces a positive signal with respect to said reference potential point when a first information bit is stored in said storage device, a negative signal with respect to said reference potential point when a second information bit is stored in said storage device, and no signal when a third information bit is stored in said storage device.

9. An electrical circuit in accordance with claim 6, wherein said unidirectional conducting device comprises a semiconductor junction.

10. An electrical circuit in accordance with claim 6, wherein said switch means comprises first and second bilateral conducting transistors each having first and second electrodes defining a conductive path and a control electrode for controlling said conductive path to produce current therethrough when activated, means coupling the conductive path of said first transistor from said first terminal of said sensor to said point of reference potential, means coupling the conductive path of said second transistor from said second terminal of said sensor to said point of reference potential, and means for activating the control electrode of said first transistor to define a first operating position for said switch means and the control electrode of said second transistor to define a second operating position for said switch means.

11. An electrical circuit in accordance with claim 10, wherein said means for activating the control electrodes of said transistors comprises a flip-flop for applying a first activating signal to said first transistor when a signal representing a binary "1" is stored in said flip-flop and a second activating signal to said second transistor when a signal representing a binary "0" is stored in said flip-flop.

References Cited by the Examiner

FOREIGN PATENTS 1,352,393 1/1964 France.

MALCOLM A. MORRISON, *Primary Examiner.*

M. P. HARTMAN, *Assistant Examiner.*